(12) United States Patent
Chien et al.

(10) Patent No.: US 10,911,730 B1
(45) Date of Patent: Feb. 2, 2021

(54) PROJECTOR

(71) Applicant: Coretronic Corporation, Hsin-Chu (TW)

(72) Inventors: Chao-Nan Chien, Hsin-Chu (TW); Wen-Hao Chu, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/735,718

(22) Filed: Jan. 7, 2020

(51) Int. Cl.
*G03B 21/14* (2006.01)
*H04N 9/31* (2006.01)
*G03B 21/20* (2006.01)
*G03B 21/16* (2006.01)

(52) U.S. Cl.
CPC ......... *H04N 9/3197* (2013.01); *G03B 21/145* (2013.01); *G03B 21/16* (2013.01); *G03B 21/2006* (2013.01)

(58) Field of Classification Search
CPC ...... G03B 21/14; G03B 21/145; G03B 21/16; G03B 21/2005; H04N 9/31; H04N 9/3197
USPC ........................................ 353/57, 58, 60, 61
See application file for complete search history.

(56) References Cited

U.S. PATENT DOCUMENTS

| 2013/0250250 A1* | 9/2013 | Lin | G03B 21/16 353/57 |
| 2014/0092368 A1* | 4/2014 | Dai | G03B 21/16 353/58 |

FOREIGN PATENT DOCUMENTS

| CN | 104808423 | 7/2015 |
| CN | 109143742 | 1/2019 |

* cited by examiner

*Primary Examiner* — William C. Dowling
(74) *Attorney, Agent, or Firm* — JCIPRNET

(57) ABSTRACT

A projector including a casing, at least one fan, a light source module, a light valve module and a projection lens is provided. The casing has a first air inlet, a second air inlet and an air outlet. The fan is disposed in the casing and adjacent to the air outlet. The light source module is disposed in the casing and adapted to provide an illumination light beam. The light valve module is disposed in the casing and adjacent to the second air inlet, and is adapted to convert the illumination light beam into an image light beam. The light source module and the light valve module at least partially overlap with each other along a first direction perpendicular to an opening of the first air inlet. The projection lens is disposed on the casing and adapted to project the image light beam out of the projector.

18 Claims, 7 Drawing Sheets

PROJECTOR

BACKGROUND

Technical Field

The invention relates to a display device, and particularly relates to a projector.

Description of Related Art

Projector is a display device for generating large-scale images. An imaging principle of the projector is to use a light valve to convert an illumination light beam produced by a light source into an image light beam, and then project the image light beam onto a screen or a wall by a projection lens.

Generally, a light source, a light combiner, a lens module, a digital micro-mirror device (DMD) and other components are disposed at the same level in a casing of a projector. This arrangement manner of the projector requires a large space in the horizontal direction, which cause the projector to have a large size. In a case that the above mentioned components are compacted for reducing the size of the projector, the heat dissipation airflow is difficult to flow through the spaces between the components, and some of the components may have low heat dissipation efficiency accordingly and are easy to fail due to over high temperature.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projector, which can be miniaturized and has high heat dissipation efficiency.

The invention provides a projector including a casing, at least one fan, a light source module, a light valve module and a projection lens. The casing has a first air inlet, a second air inlet and an air outlet. The fan is disposed in the casing and adjacent to the air outlet. The light source module is disposed in the casing and adapted to provide an illumination light beam. The light valve module is disposed in the casing and adjacent to the second air inlet, and is adapted to convert the illumination light beam into an image light beam. The light source module and the light valve module at least partially overlap with each other along a first direction perpendicular to an opening of the first air inlet. The projection lens is disposed on the casing and adapted to project the image light beam out of the projector.

Based on the above, the light source module and the light valve module are arranged to overlap with each other. By doing this, the light source module and the light valve module are not located at the same horizontal plane (perpendicular to an opening of the first air inlet) in the casing and thus the size of the projector along the horizontal direction can be reduced. Besides, since the light source module and the light valve module are respectively located at different horizontal planes in the casing, the light source module, the light valve module and other components in the casing are prevented from being too close to each other, and the heat dissipation efficiency of the above mentioned components is increased accordingly.

Further, in addition to the first air inlet corresponding to the air intake fan, the casing has the second air inlet corresponding to the light valve module, such that the heat dissipation airflow generated by the fan adjacent to the air outlet can efficiently flow through the light valve module from the second air inlet to further increase the heat dissipation efficiency of the light valve module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
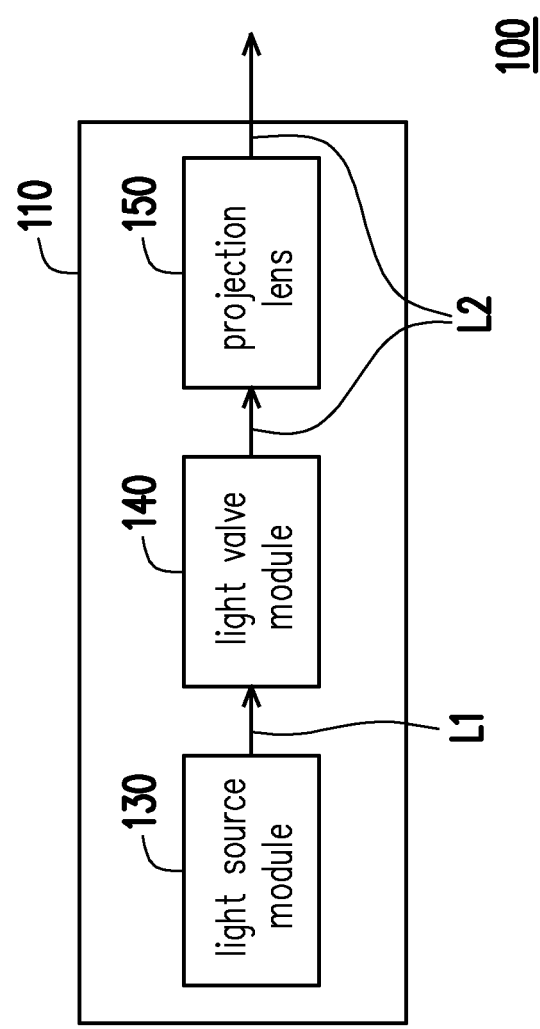
FIG. 1 is a schematic view of a projector according to an embodiment of the invention.
Figure 2:
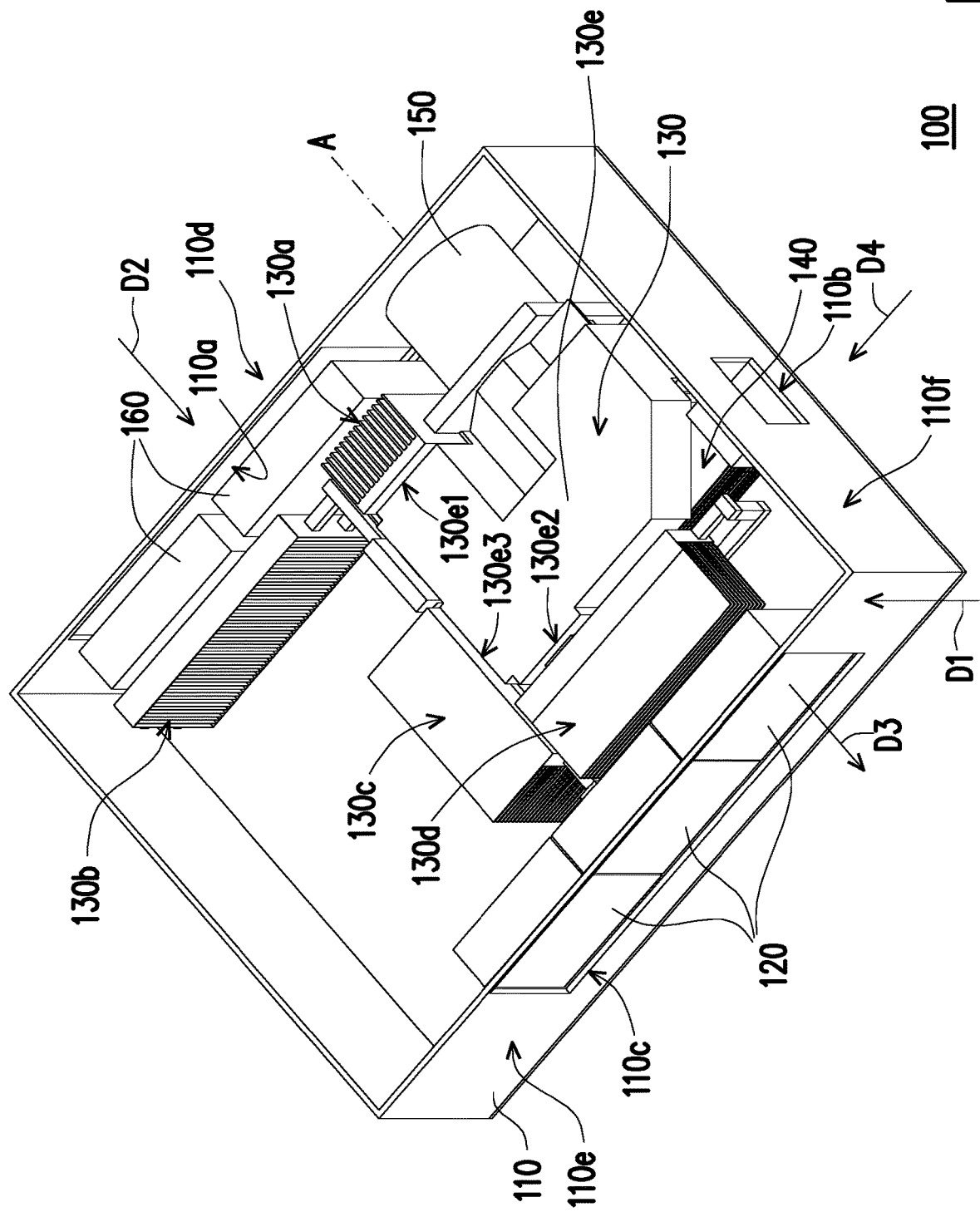
FIG. 2 is a three-dimensional view of the projector of FIG. 1.

FIG. 1 is a schematic view of a projector according to an embodiment of the invention. FIG. 2 is a three-dimensional view of the projector of FIG. 1. Referring to FIG. 1 and FIG. 2, a projector 100 of the embodiment includes a casing 110, at least one fan 120 (three fans 120 are shown), a light source module 130, a light valve module 140, a projection lens 150 and at least one air intake fan 160 (two air intake fans 160 are shown) is provided. The casing 110 has a first air inlet 110a, a second air inlet 110b and an air outlet 110c. The first air inlet 110a and the air outlet 110c are formed on two opposite sides 110d and 110e of the casing 110 respectively, the second air inlet 110b is formed on another side 110f of the casing 110 between the two opposite sides 110d and 110e of the casing 110, and the second air inlet 110b is perpendicular to the air outlet 110c.

The fans 120 are air exhaust fans, which are disposed in the casing 110 to be adjacent to the air outlet 110c. The air intake fans 160 are disposed in the casing 110 and adjacent to the first air inlet 110a. A distance between the second air inlet 110b and the light valve module 140 is less than a distance between the second air inlet 110b and each one of the light source module 130 and the at fans 120. A distance between the first air inlet 110a and the air intake fans 160 is less than a distance between the first air inlet 110a and each one of the light source module 130, the light valve module 140 and the fans 120. A distance between the air outlet 110c and the fans 120 is less than a distance between the air outlet 110c and each one of the light source module 130, the light valve module 140 and the air intake fans 160.

The fans 120 and the air intake fans 160 are adapted to generate a heat dissipation airflow flowing into the casing 110 through the first air inlet 110a and the second air inlet 110b and flowing out of the casing 110 through the air outlet 110c. The light source module 130 is disposed in the casing 110, and adapted to provide an illumination light beam L1. The light valve module 140 is disposed in the casing 110 and adjacent to the second air inlet 110b, and is adapted to convert the illumination light beam L1 into an image light beam L2. The projection lens 150 is disposed on the casing 110 and adapted to project the image light beam L2 out of the projector 100.

As shown in FIG. 2, the light source module 130 and the light valve module 140 at least partially overlap with each other along a first direction D1. The first direction D1 is perpendicular to openings of the first air inlet 110a, the second air inlet 110b and the air outlet 110c. That is, the first direction D1 is perpendicular to a first air intake direction D2 of the first air inlet 110a, a second air intake direction D3 of the second air inlet 110b and an air exhaust direction D4 of the air outlet 110c. In addition, the first direction D1 is also perpendicular to an optical axis A of the projection lens 150.

As described above, the light source module 130 and the light valve module 140 are arranged to overlap with each other. By doing this, the light source module 130 and the light valve module 140 are not located at the same horizontal plane (horizontal planes are perpendicular to the first direction D1) in the casing 110 and thus the size of the projector 100 along the horizontal directions (such as directions D2, D3 and D4) can be reduced. Besides, since the light source module 130 and the light valve module 140 are respectively located at different horizontal planes in the casing 110, the light source module 130, the light valve module 140 and other components in the casing 110 are prevented from being too close to each other, and the heat dissipation efficiency of the above mentioned components is increased accordingly. Further, in addition to the first air inlet 110a corresponding to the air intake fans 160, the casing 110 has the second air inlet 110b corresponding to the light valve module 140, such that the heat dissipation airflow generated by the fans 120 adjacent to the air outlet 110c can efficiently flow through the light valve module 140 from the second air inlet 110b to further increase the heat dissipation efficiency of the light valve module 140.

Figure 3:
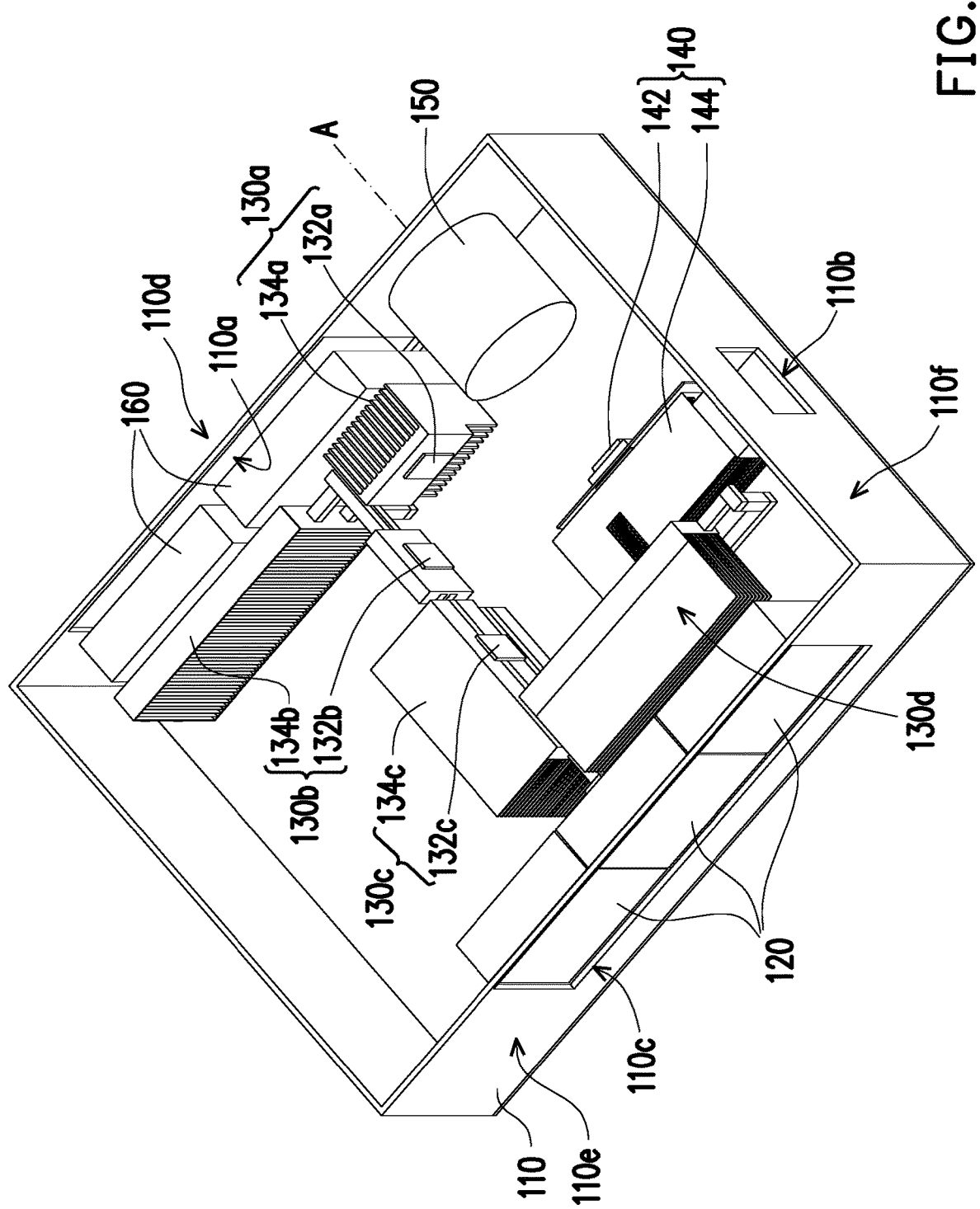
FIG. 3 is a three-dimensional view of partial components of the projector of FIG. 2.
Figure 4:
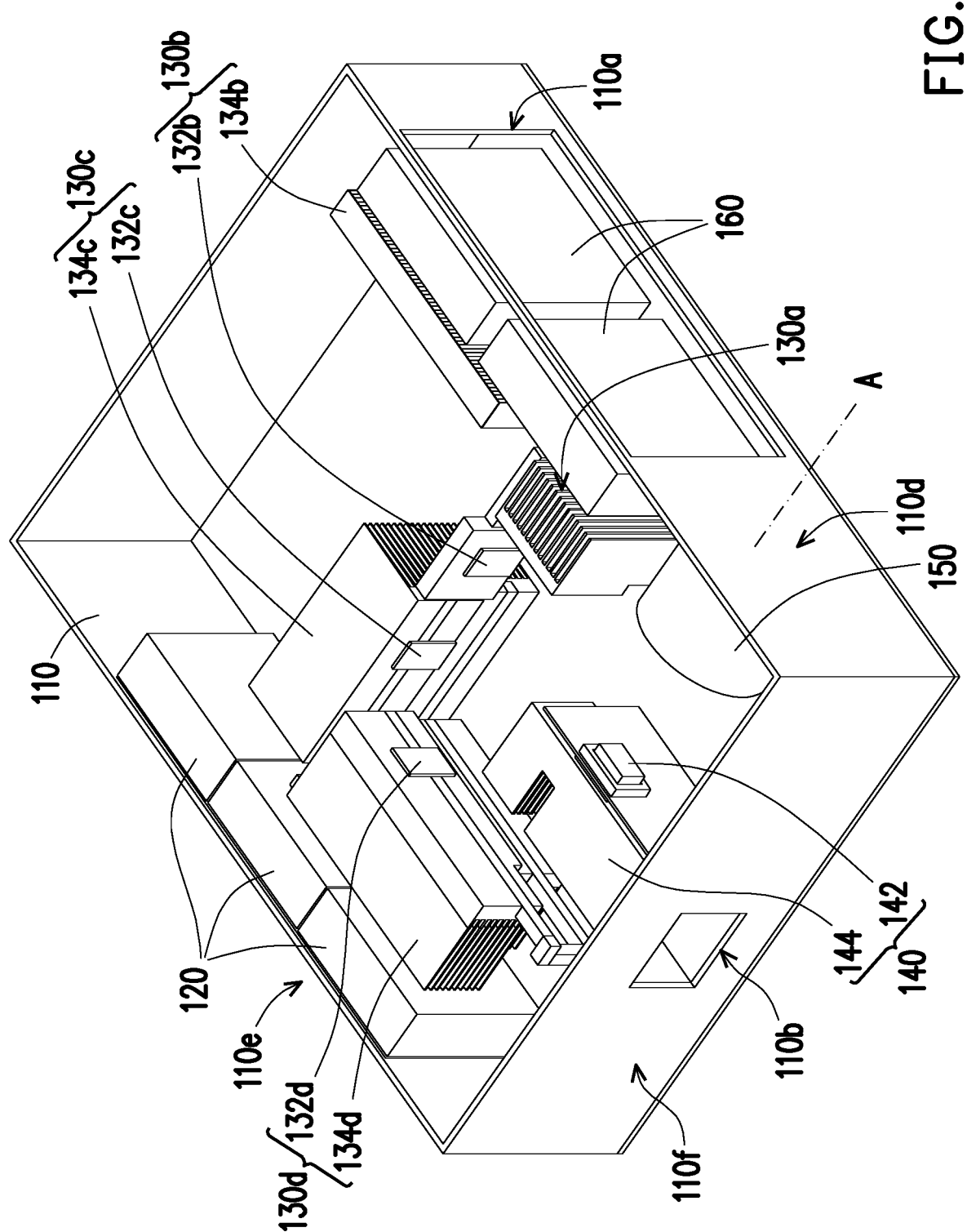
FIG. 4 is a three-dimensional view of the projector of FIG. 3 obtained from another view angle.

FIG. 3 is a three-dimensional view of partial components of the projector of FIG. 2. FIG. 4 is a three-dimensional view of the projector of FIG. 3 obtained from another view angle. Referring to FIG. 2 to FIG. 4, in detail, the light source module 130 of the embodiment includes a first blue light source 130a, a red light source 130b, a green light source 130c, a second blue light source 130d and a light combiner 130e, wherein the light combiner 130e is adapted to combine lights emitted by the first blue light source 130a, the red light source 130b, the green light source 130c and the second blue light source 130d. In the embodiment, the first blue light source 130a is adapted to emit a blue light with a wavelength of about 465 nm while the second blue light source 130d is adapted to emit a blue light with a wavelength of about 455 nm.

The temperature limitation of the red light source 130b is low than a temperature limitation of each one of the green light source 130c, the first blue light source 130a and the second blue light source 130d. The red light source module 130 has the least temperature limitation in this embodiment. A heat loading of each one of the green light source 130c and the second blue light source 130d is greater than a heat loading of each one of the red light source 130b and the first blue light source 130a. The first blue light source 130a includes a light emitter 132a and a heat dissipation structure 134a connected to the light emitter 132a, the red light source 130b includes a light emitter 132b and a heat dissipation structure 134b connected to the light emitter 132b, the green light source 130c includes a light emitter 132c and a heat dissipation structure 134c connected to the light emitter 132c, and the second blue light source 130d includes a light emitter 132d and a heat dissipation structure 134d connected to the light emitter 132d. That is, the heat dissipation structure 134a, 134b1 134c, 134d is connected to the light emitter 132a, 132b1 132c, 132d and adjacent to the first air inlet 110a or the air outlet 110c. The heat dissipation airflow flows through the first air inlet 110a, the air intake fans 160, the heat dissipation structures 134a, 134b, 134c and 134d, the fans 120 and the air outlet 110c in sequence. The heat dissipation structure 134a, 134b, 134c and 134d are, for example, heat dissipation fins structures, and the invention is not limited thereto.

In the embodiment, the heat dissipation structure 134a of the first blue light source 130a is adjacent to the first air inlet 110a, the heat dissipation structure 134b of the red light source 130b is adjacent to the first air inlet 110a, the heat dissipation structure 134c of the green light source 130c is adjacent to the air outlet 110c, and the heat dissipation structure 134d of the second blue light source 130d is adjacent to the air outlet 110c. Consequently, a distance between the first air inlet 110a and each one of the red light source 130b and the first blue light source 130a is less than a distance between the first air inlet 110a and each one of the green light source 130c and the second blue light source 130d, and a distance between the air outlet 110c and each one of the green light source 130c and the second blue light source 130d is less than a distance between the air outlet 110c and each one of the red light source 130b and the first blue light source 130a. In other embodiment, the first blue light source 130a may swap the deposition with the red light source 130b, and/or the green light source 130c may swap the deposition with the second light source 130d. That is, the green light source 130c and the second blue light source 130d, which have high heat loading and therefore generate large amount of waste heat, are arranged near the air outlet 110c to be located at the downstream of the heat dissipation airflow, so as to prevent the waste heat generated by the green light source 130c and the second blue light source 130d from affecting the heat dissipation efficiency of the first blue light source 130a and the red light source 130b. In addition, the red light source 130b, which has low temperature limitation and is sensitive to environmental temperature, is arranged near the first air inlet 110a to be located at the upstream of the heat dissipation airflow, so as to prevent unpredictable variation of the luminescent efficiency of the red light source 130b due to over high temperature.

More specifically, the first blue light source 130a and the second blue light source 130d are located at two opposite sides 130e1 and 130e2 of the light combiner 130e respectively, and the red light source 130b and the green light source 130c are both located at another side 130e3 of the light combiner 130e between the two opposite sides 130e1 and 130e2 of the light combiner 130e. In other embodiments, the positions of the first blue light source 130a and the red light source 130b may be exchanged, the positions of the green light source 130c and the second blue light source 130d may be exchanged, and the invention is not limited thereto. For example, the first blue light source 130a and the second blue light source 130d are respectively located at two sides of one corner of the light combiner 130e, and the red light source 130b and the green light source 130c are respectively located at two sides of another corner of the light combiner 130e.

In the embodiment, the light valve module 140 includes a light valve 142 and a heat dissipation structure 144 connected to the light valve 142, the heat dissipation structure 144 is located between the light valve 142 and the fans 120, and the second heat dissipation airflow flows through the second air inlet 110b, the heat dissipation structure 144, the fans 120 and the air outlet 110c in sequence. The heat dissipation structure 144 is, for example, a heat dissipation fins structure, and the invention is not limited thereto.

Figure 5:
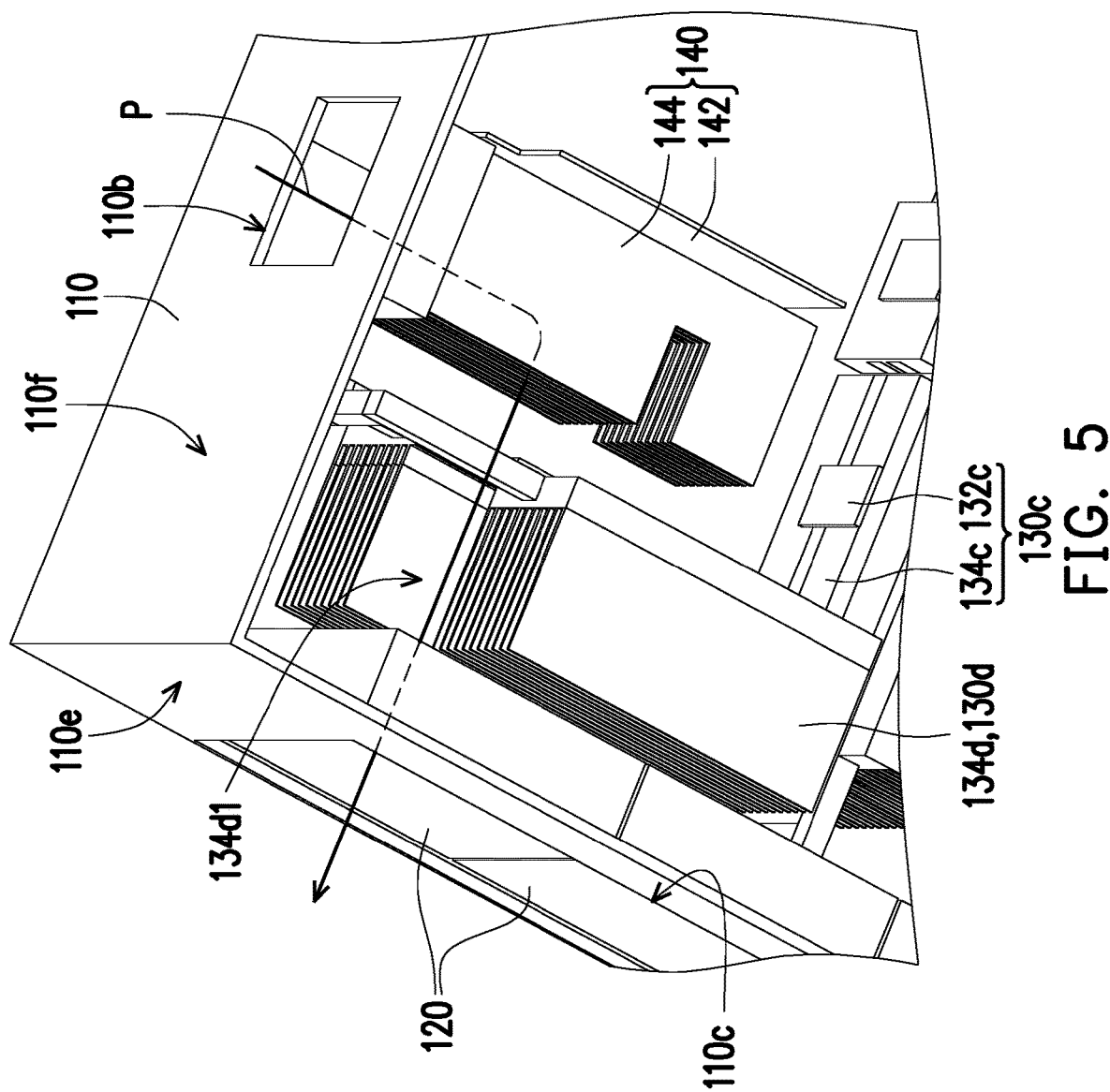
FIG. 5 is a three-dimensional view of partial components of the projector of FIG. 3 obtained from another view angle.

FIG. 5 is a three-dimensional view of partial components of the projector of FIG. 3 obtained from another view angle. Referring to FIG. 5, the light valve module 140 or the heat dissipation structure 144 thereof is located between the two sides 110f and 110e of the casing 110. An air guiding passage corresponding to the flowing path P of the second heat dissipation airflow is formed inside the casing 110 and extends from the second air inlet 110b toward the air outlet 110c to pass through the heat dissipation structure 144 of the light valve module 140. The shape of the heat dissipation structure 134c of the green light source 130c or the shape of the heat dissipation structure 134d of the second blue light source 130d has a notch 134d1, so that the air guiding passage goes through the notch 134d1 without being blocked by the heat dissipation structure 134d. In the embodiment, the air guiding passage is illustrated as a part of the flowing path P inside the casing 110 and may constituted by some guiding structures inside the casing 110 and parts of the heat dissipation structures 144 and 134d. That is, a distance between the heat dissipation structure 144 of the light valve module 140 and the second air inlet 110b is less than a distance between the second air inlet 110b and the red light source 130b and a distance between the second air inlet 110b and the first blue light source 130a, and thus this arrange can prevent the second heat dissipation airflow containing the heat generated by the light source module 130 to effect the light valve module 140 via the second heat dissipation airflow.

Figure 6:
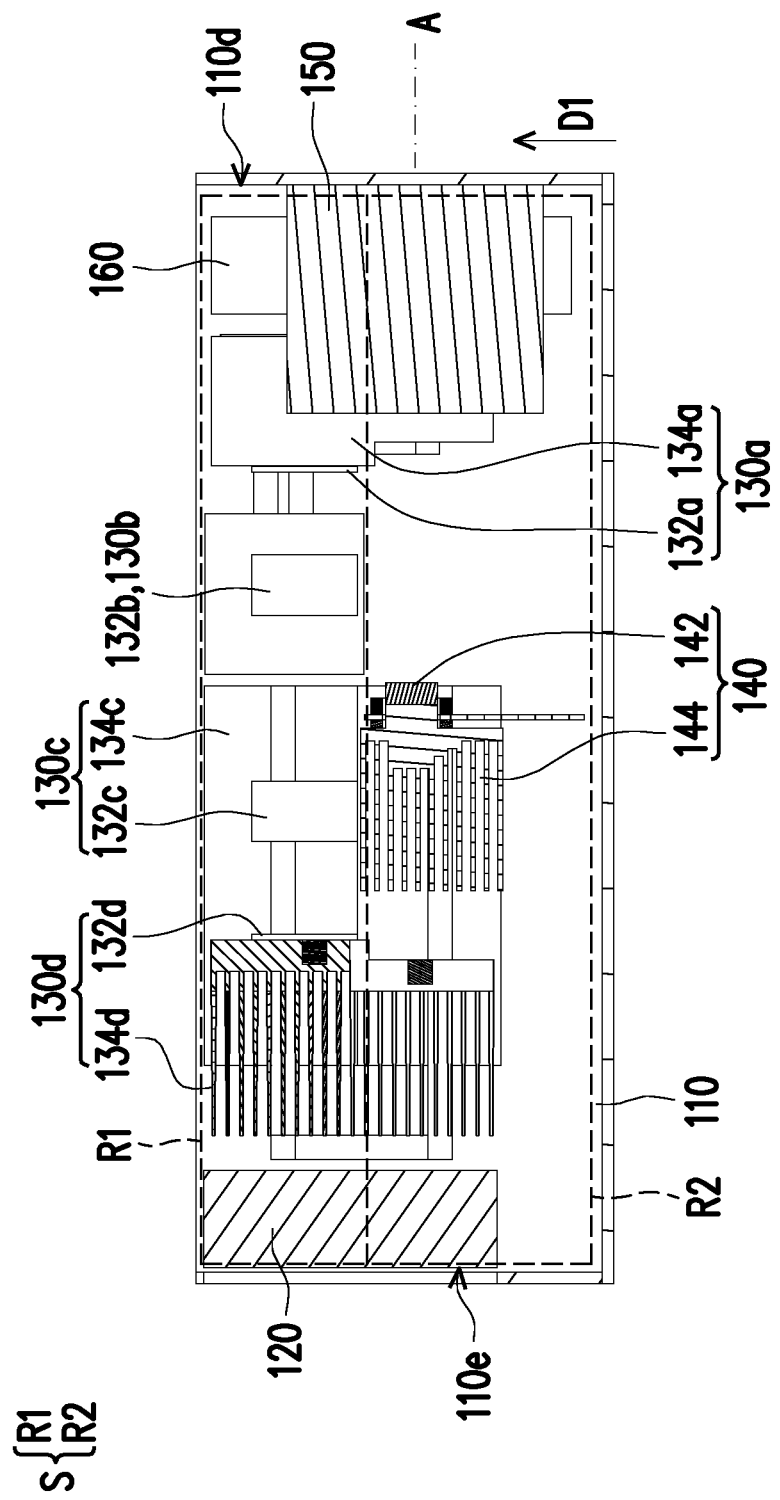
FIG. 6 is a side view of partial components of the projector of FIG. 3.

FIG. 6 is a side view of partial components of the projector of FIG. 3. Referring to FIG. 3, FIG. 4 and FIG. 6, an inner space S of the casing 110 includes a first region R1 and a second region R2 located under the first region R1 along the first direction D1, the light source module 130 (labeled in FIG. 1) is located in the first region R1, the light valve module 140 is located in the second region R2, such that the light source module 130 and the light valve module 140 overlap with each other along the first direction D1 as described above. In the embodiment, the heat dissipation structures 134a, 134b, 134c and 134d of the light sources 130a, 130b, 130c and 130d may extend into the second region R2 along the first direction D1, and the heat dissipation structure 144 of the light valve module 142 may extend into the first region R1 along the first direction D1. In other embodiments, the light sources 130a, 130b, 130c and 130d and the heat dissipation structures 134a, 134b, 134c and 134d thereof may be entirely located in the first region R1, and the light valve module 142, the heat dissipation structure 144 thereof may be entirely located in the second region R2, and the invention is not limited thereto.

Figure 7:
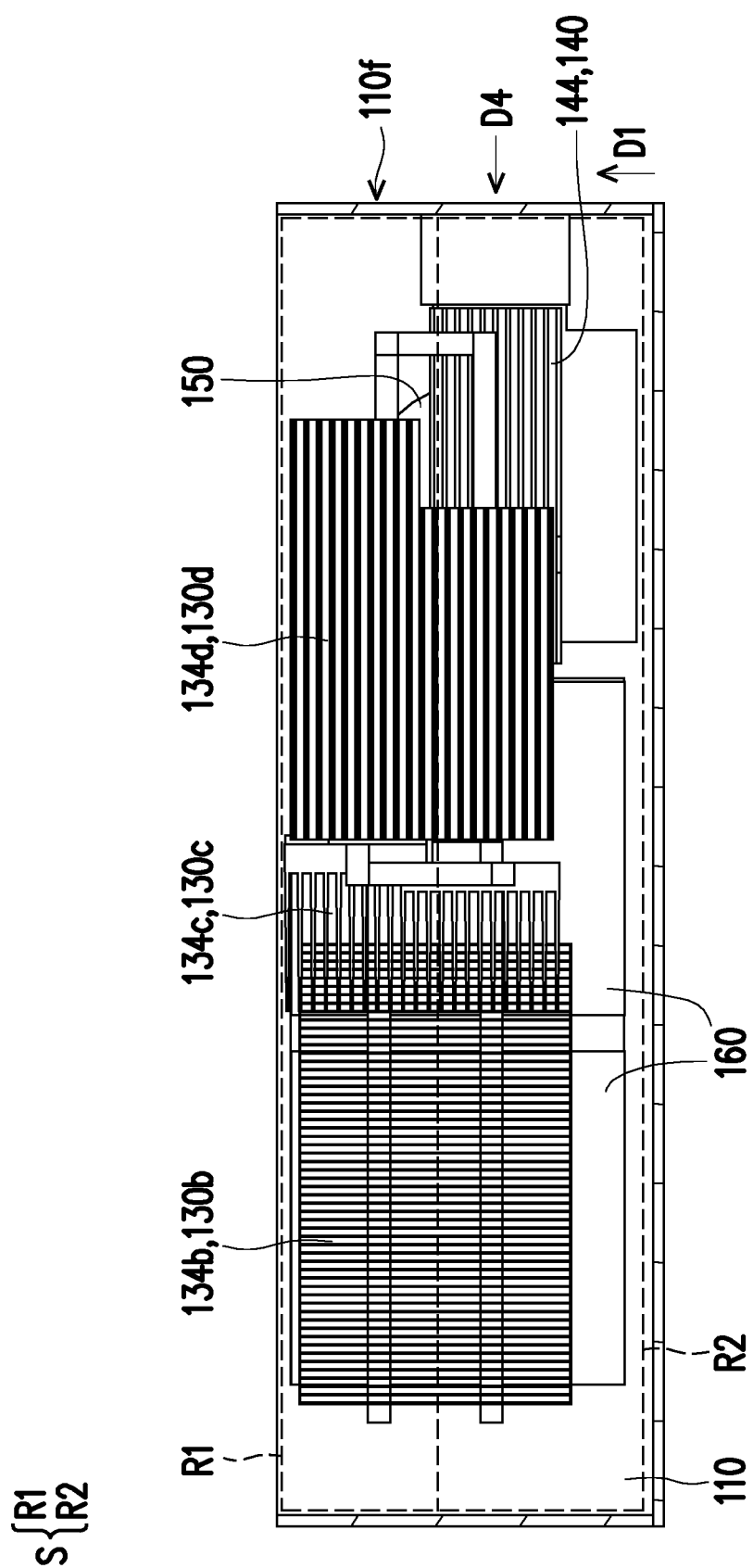
FIG. 7 is another side view of partial components of the projector of FIG. 3.

FIG. 7 is another side view of partial components of the projector of FIG. 3. In the embodiment, the projection in the second region R2 of the heat dissipation structure 134d or 134c located between the heat dissipation structure 144 and the air outlet 110c is partially not overlap with the projection in the second region R2 of the heat dissipation structure 144 of the light valve module 142 along a plane parallel to the opening of the air outlet 110c. As a result, the arrangement contributes that the second heat dissipation airflow flowing into the casing 110 through the second air inlet 110b passes through the heat dissipation structure 144 and then flows out of the casing 110 through the air outlet 110c. In other embodiment, the heat dissipation structure 134d or 134c located between the heat dissipation structure 144 and the air outlet 110c has a length in the first region R1 along the exhaust direction D4 longer than a length in the second region R2 along the exhaust direction D4 so as to form the notch and thereby maintain the high heat dissipation efficiency of the heat dissipation structure 144 and the heat dissipation structure 134d or 134c located between the heat dissipation structure 144 and the air outlet 110c.

In summary, the light source module and the light valve module are arranged to overlap with each other. By doing this, the light source module and the light valve module are not located at the same horizontal plane in the casing and thus the size of the projector along the horizontal direction can be reduced. Besides, since the light source module and the light valve module are respectively located at different horizontal planes in the casing, the light source module, the light valve module and other components in the casing are prevented from being too close to each other, and the heat dissipation efficiency of the above mentioned components is increased accordingly. Further, in addition to the first air inlet corresponding to the air intake fan, the casing has the second air inlet corresponding to the light valve module, such that the second heat dissipation airflow generated by the fan adjacent to the air outlet can efficiently flow through the light valve module from the second air inlet to further increase the heat dissipation efficiency of the light valve module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
   a casing, having a first air inlet, a second air inlet and an air outlet;
   at least one fan, disposed in the casing and adjacent to the air outlet;
   a light source module, disposed in the casing and adapted to provide an illumination light beam;
   a light valve module, disposed in the casing and adjacent to the second air inlet, and adapted to convert the illumination light beam into an image light beam, wherein the light source module and the light valve module at least partially overlap with each other along a first direction perpendicular to an opening of the first air inlet; and
   a projection lens, disposed on the casing and adapted to project the image light beam out of the projector.

2. The projector according to claim 1, further comprising at least one air intake fan disposed in the casing and adjacent to the first air inlet.

3. The projector according to claim 1, wherein the first direction is perpendicular to an optical axis of the projection lens.

4. The projector according to claim 1, wherein the light source module comprises a plurality of light sources, each of the light sources comprises a light emitter and a heat dissipation structure, the heat dissipation structure is connected to the light emitter and adjacent to the first air inlet or the air outlet.

5. The projector according to claim 4, wherein an inner space of the casing comprises a first region and a second region located under the first region along the first direction, the light source module is located in the first region, the light valve module is located in the second region, and the heat dissipation structure of at least one of the light sources extends into the second region along the first direction.

6. The projector according to claim 4, wherein the light sources comprise a red light source, a green light source, a first blue light source and a second blue light source, and a temperature limitation of the red light source is less than a temperature limitation of each one of the green light source, the first blue light source and the second blue light source, a heat loading of each one of the green light source and the second blue light source is greater than a heat loading of each one of the red light source and the first blue light source.

7. The projector according to claim 6, wherein a distance between the first air inlet and each one of the red light source and the first blue light source is less than a distance between the first air inlet and each one of the green light source and the second blue light source, and a distance between the air outlet and each one of the green light source and the second blue light source is less than a distance between the air outlet and each one of the red light source and the first blue light source.

8. The projector according to claim 6, wherein one of the red light source and the first blue light source and one of the green light source and the second blue light source are located at two opposite sides of a light combiner respectively, and another one of the red light source and the first blue light source and another one of the green light source and the second blue light source are both located at another side of the light combiner between the two opposite sides of the light combiner.

9. The projector according to claim 2, wherein the light valve module comprises a light valve and a heat dissipation structure, the heat dissipation structure is connected to the light valve and located between the light valve and the at least one fan.

10. The projector according to claim 9, wherein an inner space of the casing comprises a first region and a second region located under the first region along the first direction, the light source module is located in the first region, the light valve module is located in the second region, and the heat dissipation structure of the light valve module extends into the first region along the first direction.

11. The projector according to claim 1, wherein the first air inlet and the air outlet are formed on two opposite sides of the casing respectively, and the second air inlet is formed on another side of the casing between the two opposite sides of the casing.

12. The projector according to claim 1, wherein the second air inlet is formed on a side of the casing, and the air outlet is formed on another side of the casing, the second air inlet is perpendicular to the air outlet, and the light valve module or a heat dissipation structure thereof is located between the two sides.

13. The projector according to claim 1, wherein an air guiding passage is formed inside the casing and extending from the second air inlet toward the air outlet.

14. The projector according to claim 9, wherein an air guiding passage is formed inside the casing and passing through the heat dissipation structure of the light valve module.

15. The projector according to claim 6, wherein an air guiding passage is formed inside the casing and extends from the second air inlet toward the air outlet, the shape of the heat dissipation structure of the green light source or the second blue light source has a notch, so that the air guiding passage goes through the notch.

16. The projector according to claim 1, wherein a distance between the second air inlet and the light valve module is less than a distance between the second air inlet and each one of the light source module and the at least one fan.

17. The projector according to claim 2, wherein a distance between the first air inlet and the air intake fan is less than a distance between the first air inlet and each one of the light source module, the light valve module and the at least one fan.

18. The projector according to claim 1, wherein a distance between the air outlet and the at least one fan is less than a distance between the air outlet and each one of the light source module, the light valve module and the at least one air intake fan.

* * * * *